US00RE37927E

(19) United States
(12) Reissued Patent
Fitch

(10) Patent Number: US RE37,927 E
(45) Date of Reissued Patent: Dec. 10, 2002

(54) FOLDING SWIVEL CHAIR

(76) Inventor: James G. Fitch, 2290 Adrian St., Napa, CA (US) 94558

(21) Appl. No.: 09/177,183

(22) Filed: Oct. 22, 1998

Related U.S. Patent Documents

Reissue of:
(64) Patent No.: 5,567,014
Issued: Oct. 22, 1996
Appl. No.: 08/537,525
Filed: Oct. 2, 1995

(51) Int. Cl.[7] ..... A47C 1/02
(52) U.S. Cl. ..... 297/344.21; 297/54
(58) Field of Search ..... 297/344.21, 34, 297/35, 51, 53, 54, 3

(56) References Cited

U.S. PATENT DOCUMENTS 2,724,430 A * 11/1955 Garner ..... 297/54 X
2,876,825 A * 3/1959 Boortz ..... 297/54 X
4,226,398 A * 10/1980 Freber ..... 297/344.21 X
4,441,756 A * 4/1984 Liou et al. ..... 297/35 X
4,482,184 A * 11/1984 Mincey ..... 97/344.21 X
4,682,561 A * 7/1987 Jentry ..... 297/344.21 X
5,364,163 A * 11/1994 Hardison ..... 297/344.21

* cited by examiner

*Primary Examiner*—Laurie K. Cranmer
(74) *Attorney, Agent, or Firm*—Gerald L. Robertson

(57) ABSTRACT

A folding swivel chair comprised of an upper section having a seat portion. A swivel mechanism is secured to the seat portion of the upper section. The device includes a lower section having a pair of folding leg sections foldably secured together by two cross bars. The two cross bars are secured to the swivel mechanism. The swivel mechanism allows the upper sections to swivel in relationship to the lower section.

1 Claim, 3 Drawing Sheets

FOLDING SWIVEL CHAIR

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a folding swivel chair and more particularly pertains to providing a chair having both foldability and swiveling features with a folding swivel chair.

2. Description of the Prior Art

The use of folding chairs is known in the prior art. More specifically, folding chairs heretofore devised and utilized for the purpose of providing foldability for chairs are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,358,263 to Aldus et al. discloses a wheel chair made of a lightweight metal frame having a series of caster wheels for providing rotatability.

U.S. Pat. No. 4,108,490 to Marin discloses a folding chair having a seat member and four legs at the corners of the seat member with the two front legs extending from the seat member downwardly and with the two rear legs extending both upwardly and downwardly from the seat.

U.S. Pat. No. Design 284,529 to Reed discloses the ornamental design for a folding stool.

U.S. Pat. No. 4,583,778 to Liebhold discloses a folding knock-down chair with swingable seat support.

U.S. Pat. No. 4,629,245 to Hardarson discloses a folding chair.

U.S. Pat. Design 250,498 to Hogford discloses the ornamental design for a folding stool.

While these devices fulfill their respective, particular objective and requirements, the aforementioned patents do not describe a folding swivel chair for providing a chair having both foldability and swiveling features.

In this respect, the folding swivel chair according to the present invention substantially departs from the conventional concepts and designs of the prior art, and in doing so provides an apparatus primarily developed for the purpose of providing a chair having both foldability and swiveling features.

Therefore, it can be appreciated that there exists a continuing need for new and improved folding swivel chair which can be used for providing a chair having both foldability and swiveling features. In this regard, the present invention substantially fulfills this need.

SUMMARY OF THE INVENTION

In the view of the foregoing disadvantages inherent in the known types of folding chairs now present in the prior art, the present invention provides an improved folding swivel chair. As such, the general purpose of the present invention, which will be described subsequently in greater detail, is to provide a new and improved folding swivel chair and method which has all the advantages of the prior art and none of the disadvantages.

To attain this, the present invention essentially comprises an upper section having a seat portion. The seat portion has a back rest portion foldably secured to a distal end thereof. The upper section has a pair of arm rest portions foldably secured to the back rest portion and extending inwardly therefrom. Each arm rest portion has a bracket foldably secured to the seat portion. The device includes a swivel mechanism comprised of an upper plate, a lower plate, and a neophreme layer therebetween. The upper plate and the lower plate and the neophreme layer are coupled together by a nut and bolt extending through a bushing through the coupled together upper plate, lower plate, and neophreme layer. The upper plate has two pairs of outwardly extending brackets secured to opposing sides thereof. The brackets are secured to the seat portion of the upper section. The lower plate has two pairs of outwardly extending brackets secured to opposing sides thereof. The device includes a lower section having a pair of folding leg sections foldably secured together by two cross bars. The two cross bars are secured to the two pairs of outwardly extending brackets of the lower plate of the swivel mechanism.

There has thus been outlined, rather broadly, the more important features of the invention in order that the detailed description thereof that follows may be better understood, and in order that the present contribution in the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and system for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved folding swivel chair which has all the advantages of the prior art folding chairs and none of the disadvantages.

It is another object of the present invention to provide a new and improved folding swivel chair which may be easily and efficiently manufactured and marketed.

It is a further object of the present invention to provide a new and improved folding swivel chair which is of durable and reliable construction.

An even further object of the present invention is to provide a new and improved folding swivel chair which is susceptible of a low cost of manufacture with regard to both materials and labor, and which accordingly is then susceptible of low prices of sale to the consuming public, thereby making such a folding swivel chair economically available to the buying public.

Still yet another object of the present invention is to provide a new and improved folding swivel chair which provides in the apparatuses and methods of the prior art some of the advantages thereof, while simultaneously overcoming some of the disadvantages normally associated therewith.

Even still another object of the present invention is to provide a new and improved folding swivel chair for providing a chair having both foldability and swiveling features.

Lastly, it is an object of the present invention to provide a new and improved folding swivel chair comprised of an upper section having a seat portion. A swivel mechanism is secured to the seat portion of the upper section. The device includes a lower section having a pair of folding leg sections foldably secured together by two cross bars. The two cross bars are secured to the swivel mechanism. The swivel mechanism allows the upper section to swivel in relationship to the lower section.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
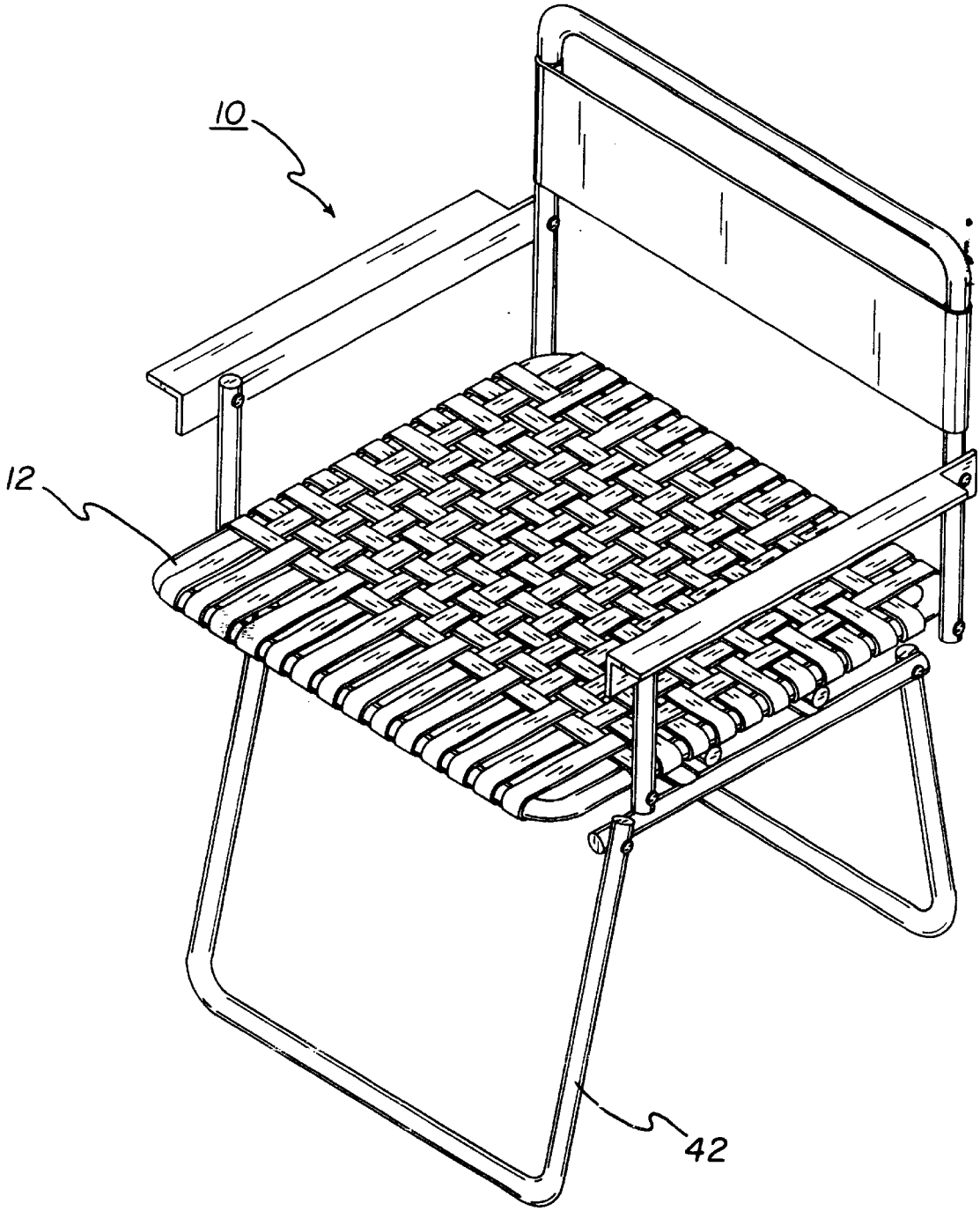
FIG. 1 is a perspective view of the preferred embodiment of the folding swivel chair constructed in accordance with the principles of the present invention.
Figure 3:
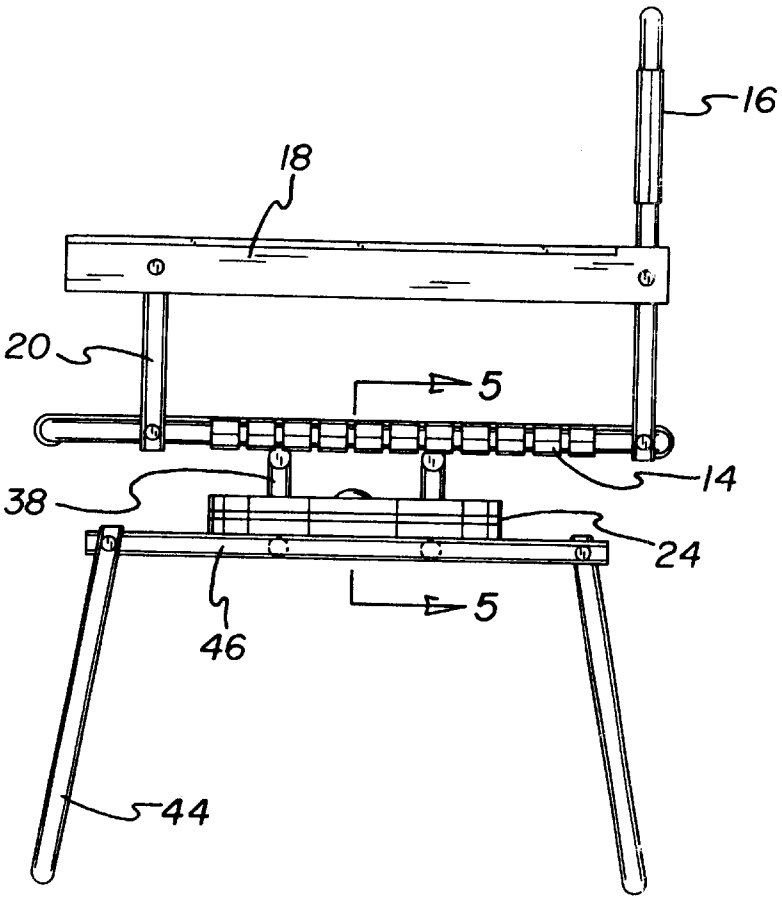
FIG. 3 is a side elevation view of the present inventing.
Figure 2:
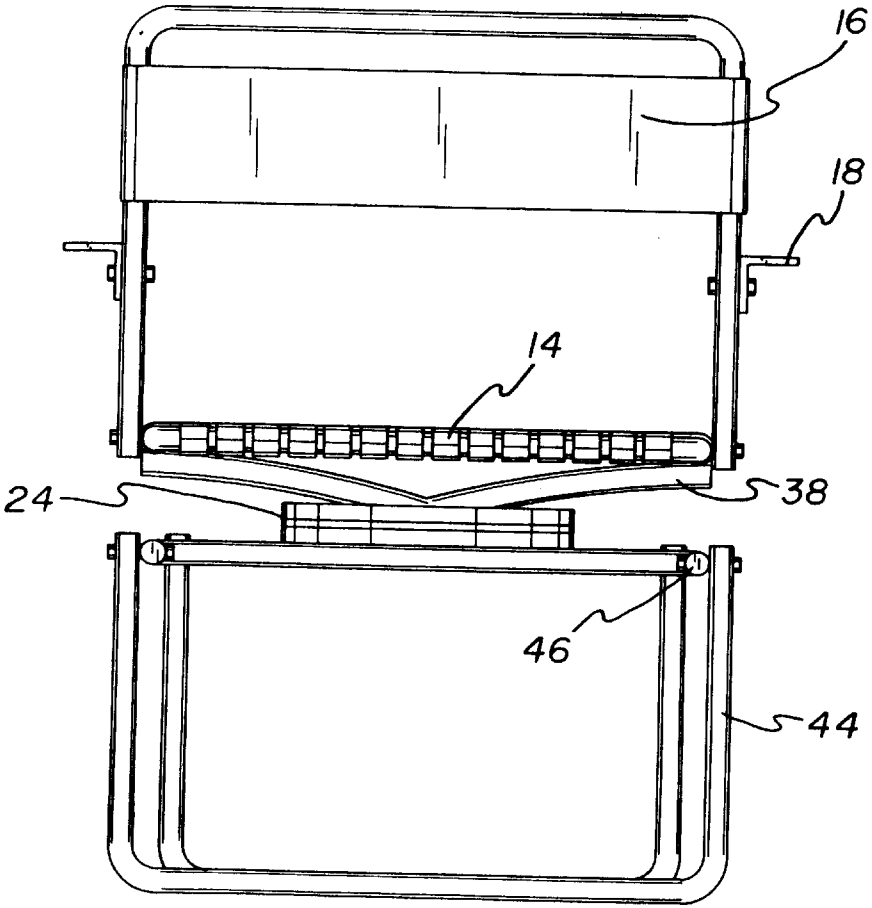
FIG. 2 is a rear elevation view of the present invention.
Figure 4:
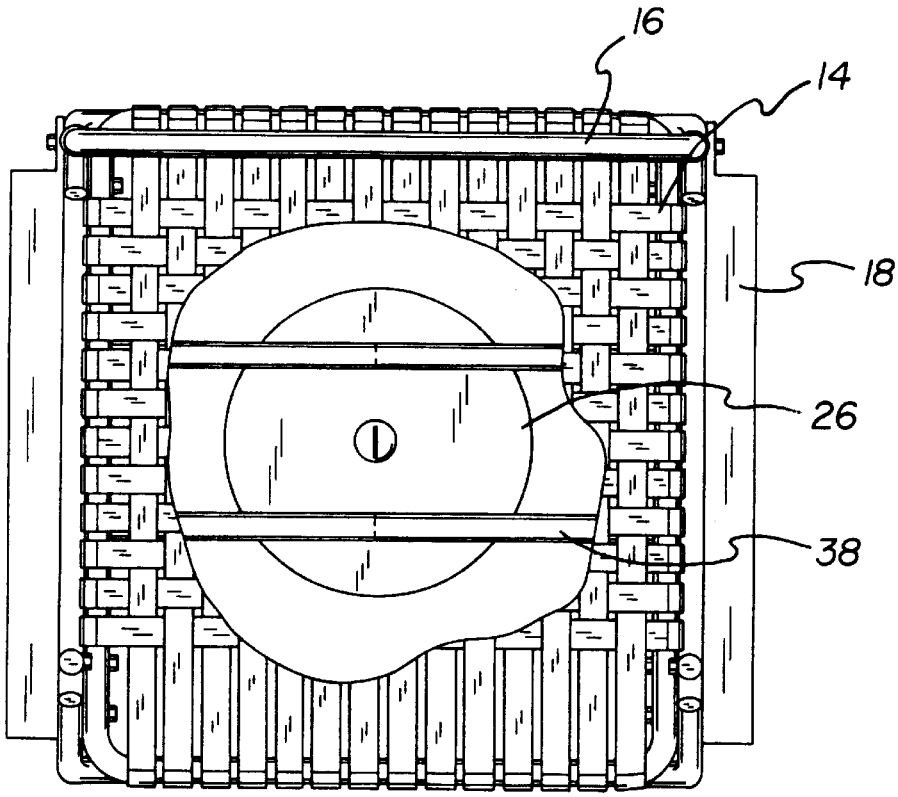
FIG. 4 is a plan view of the present invention illustrating the swiveling feature.
Figure 5:
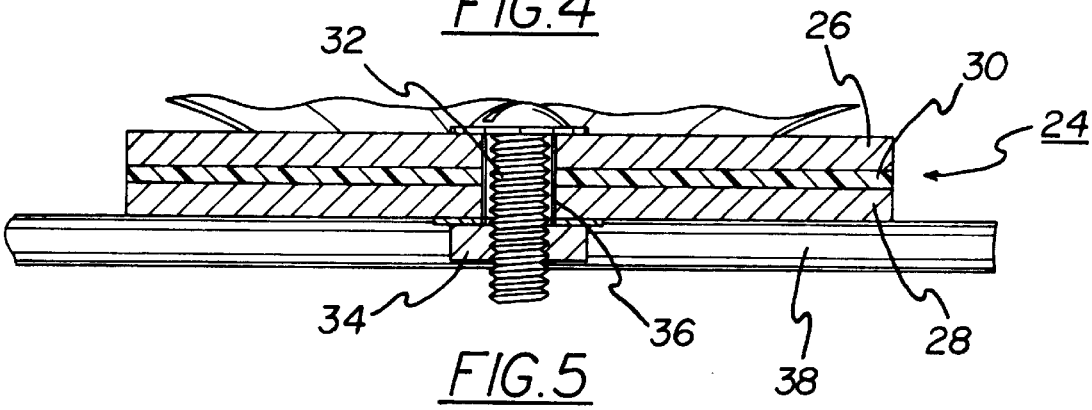
FIG. 5 is a cross-sectional view of the swivel feature of the present invention.
Figure 6:
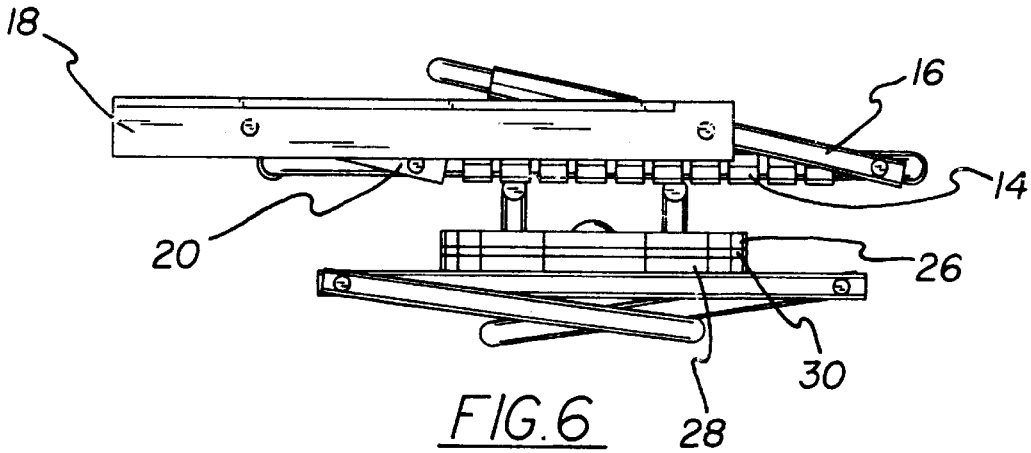
FIG. 6 side view of the present invention show the folded configuration.

With reference now to the drawings, and in particular, to FIGS. 1–6 thereof, the preferred embodiment of the new and improved folding swivel chair embodying the principles and concepts of the present invention and generally designated by the reference number 10 will be described.

Specifically, it will be noted in the various Figures that the device relates to a new and improved folding swivel chair for providing a chair having both foldability and swiveling features. In its broadest context, the device consists of an upper section, a swivel mechanism, and a lower section.

Such components are individually configured and correlated with respect to each other so as to attain the desired objective.

The device 10 includes an upper section 12 having a seat portion 14. The seat portion 14 is fabricated of crossing plastic strips or a synthetic nylon strip or some other material suitable for folding chairs. The seat portion 14 has a back rest portion 16 foldably secured to a distal end thereof. The back rest portion 16 can be folded inwardly on top of the seat portion 14 in a folded configuration. The upper section 16 has a pair of arm rest portions 18 foldably secured to the back rest portion 16 and extending inwardly therefrom. Each arm rest portion 18 has a bracket 20 foldably secured to the seat portion 14. The brackets 20 when pivoted, allow the arm rest portions 18 to fold atop the seat portion 14 in the folded configuration.

Next, the device 10 includes a swivel mechanism 24 comprised of an upper plate 26, a lower plate 28, and a neophreme layer 30 therebetween. The upper plate 26 and the lower plate 28 are of similar dimensions. The upper plate 26 and the lower plate 28 and the neophreme layer 30 are coupled together by a bolt 32 and nut 34 extending through a bushing 36 through the coupled together upper plate 26, lower plate 28, and neophreme layer 30. The bushing 36 allows for the free rotation of the upper plate 26 relative to the lower plate 28. The neophreme layer 30 facilitates the rotation of the upper plate 26 relative to the lower plate 28. The upper plate 26 has two pairs of outwardly extending brackets 38 secured to opposing sides thereof. The brackets 38 are secured to the seat portion 14 of the upper section 12. The lower plate 28 has two pairs of outwardly extending brackets 38 secured to opposing sides thereof.

Next, the device 10 includes a lower section 42 having a pair of folding leg sections 44 foldably secured together by two cross bars 46. The two cross bars 46 are secured to the two pairs of outwardly extending brackets 38 of the lower plate 28 of the swivel mechanism 24. The pair of folding legs 44 can both be folded inwardly to a position adjacent to the seat portion 14 of the upper section 12. Once the device 10 is unfolded into an erected configuration, a user can sit on the seat portion 14 and be able to swivel while seated simply by using their feet to turn the seat portion 14 to the right or the left. The swivel mechanism 24 will allow the seat upper section 12 to swivel in any direction desired relative to the lower section 42, which will maintain its position on the floor.

As to the manner of usage and operation of the present invention, the same should be apparent from the above description. Accordingly, no further discussion relating to the manner of usage and operation will be provided.

With respect to the above description then, it to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A folding swivel chair that provides a chair having both foldability and swiveling features comprising, in combination:

an upper section having a seat portion [fabricated of crossing plastic strips], the seat portion having a back rest portion foldably secured to a distal end thereof with the back rest capable of folding inwardly on top of the seat portion in a folded orientation, the upper section having a pair of arm rest portions foldably secured to the back rest portion and extending inwardly therefrom, each arm rest portion having a bracket foldably secured to the seat portion for allowing the arm rest portions to fold atop the seat portion in the folded orientation;

a swivel mechanism comprised of an upper plate, a lower plate, and a neophreme layer therebetween, the upper plate and the lower plate and the neophreme layer being coupled together by a nut and bolt extending through a bushing through the coupled together upper plate, lower plate, and neophreme layers with the upper plate and lower plate being of similar dimensions, the upper plate having two pairs of outwardly extending brackets secured to opposing sides thereof, the brackets secured to the seat portion of the upper section, the lower plate having two pairs of outwardly extending brackets secured to opposing sides thereof; and a lower section having a pair of folding leg sections foldably secured together by two cross bars, the two cross bars being secured to the two pairs of outwardly extending brackets of the lower plate of the swivel mechanism, wherein the pair of folding legs can be both folded inwardly to a position adjacent to the seat portion of the upper section.

* * * * *